(12) United States Patent
Nakura et al.

(10) Patent No.: US 6,776,652 B2
(45) Date of Patent: Aug. 17, 2004

(54) CONNECTOR DEVICE AND CONNECTOR

(75) Inventors: Yuji Nakura, Nagoya (JP); Hitoshi Imazu, Nagoya (JP); Kazuhiro Asada, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/133,352

(22) Filed: Apr. 29, 2002

(65) Prior Publication Data

US 2002/0164899 A1 Nov. 7, 2002

(30) Foreign Application Priority Data

May 7, 2001 (JP) ........................................ 2001-135853
Jun. 13, 2001 (JP) ........................................ 2001-177999

(51) Int. Cl.[7] ............................................ H01R 13/60
(52) U.S. Cl. .................... 439/540.1; 439/291; 439/109; 439/924.1; 439/607; 439/541.5
(58) Field of Search ............................ 439/540.1, 109, 439/291, 924.1, 607, 541.5

(56) References Cited

U.S. PATENT DOCUMENTS

| | | | | |
|---|---|---|---|---|
| 5,176,528 A | * | 1/1993 | Fry et al. .................... 439/181 |
| 5,415,566 A | * | 5/1995 | Brunker et al. .............. 439/608 |
| 5,531,612 A | * | 7/1996 | Goodall et al. ........... 439/541.5 |
| 5,876,248 A | * | 3/1999 | Brunker et al. .............. 439/608 |
| 6,095,698 A | | 8/2000 | Strab et al. |
| 6,341,899 B1 | * | 1/2002 | Shirakawa et al. ........... 385/88 |
| 6,454,463 B1 | * | 9/2002 | Halbach et al. ................ 385/60 |

FOREIGN PATENT DOCUMENTS

| | | |
|---|---|---|
| JP | A 6-342115 | 12/1994 |
| JP | A 11-214100 | 8/1999 |
| JP | U 3067249 | 12/1999 |

* cited by examiner

*Primary Examiner*—Truc Nguyen
(74) *Attorney, Agent, or Firm*—Oliff & Berridge, PLC (57) ABSTRACT

An optical coupling connector portion, including ferrule portions, is provided at a widthwise central portion of a connector housing having a shape flattened in a direction of the width thereof. Female connection terminal portions, serving as electrical connection terminals, are provided in a distributed manner at widthwise opposite side portions of the connector housings disposed outwardly respectively of opposite sides of the optical coupling connector portion. An optical coupling connector portion, including ferrule receiving portions for respectively receiving the ferrule portions, is provided at a widthwise central portion of a second connector housing. Male connection terminal portions, serving as electrical connection terminal portions, are provided in a distributed manner at widthwise opposite side portions of the connector housing in corresponding relation to the female connection terminal portions.

12 Claims, 5 Drawing Sheets

CONNECTOR DEVICE AND CONNECTOR

BACKGROUND OF THE INVENTION

1. Field of the Invention

This invention relates to a connector device and a connector which effect both optical connection and electrical connection.

2. Background Art

In some form of data communication, an optical communication line, using an optical fiber, and an electrical line (such as an electrical communication line or a power supply line), using wires, are laid in a juxtaposed manner. In this case, if the optical communication line and the electrical line are installed in a bundled manner, this installing operation can be carried out easily. In the connection of the optical communication line and electrical line to predetermined equipments or other lines, if an optical connector portion 1020 and an electrical connector portion 1040 are combined together to provide a single connector 1000 as shown in FIG. 9, the number of the component parts and the time and labor, required for the connecting operation, can be reduced as compared with the case where their connection portions are connected respectively to separate connectors, and therefore this is desirable.

Figure 9:
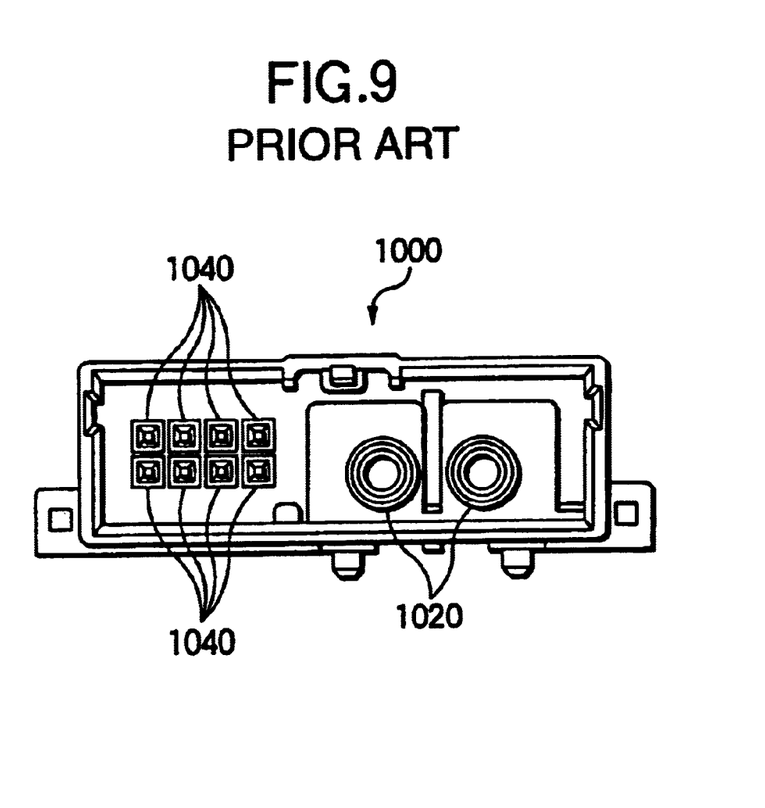
FIG. 9 is a view showing a conventional connector.

In the connector shown in FIG. 9, the optical connector portion 1020 is provided at one side portion (right side portion in the drawing sheet) of the connector 1000 while the electrical connector portion 1040 is provided at the other side portion (left side portion in the drawing sheet) of the connector 1000. Therefore, if the electrical connector portion 1040 has many female terminals, a large force is required for fittingly connecting an electrical connector portion of a mating connector to the electrical connector portion 1040 and for withdrawing the former from the latter. In this case, if the force, required for fittingly connecting and withdrawing the electrical connector portion of the mating connector relative to the electrical connector portion 1040, is different from the force required for fittingly connecting and withdrawing an optical connector portion of the mating connector relative to the optical connector portion 1020, the one side portion and the other side portion of the connector 1000 are not balanced with each other with respect to the force for fittingly connecting and withdrawing the mating connector relative to the connector 1000. In this case, when fittingly connecting and withdrawing the mating connector relative to the connector 1000, the mating connector is liable to be brought into an inclined posture relative to the connector 1000, so that an undue load is exerted on ferrules of the optical connector portion 1020 and the terminals of the electrical connector portion 1040, and therefore there is a fear that these portions are deformed or damaged.

Moreover, when the electrical signal and power terminals and the optical element are thus incorporated in the single connector, there is a fear that the electrical signal and power terminals are adversely affected by noises from the optical element while the optical element is adversely affected by noises from the electrical signal and power terminals, since these terminals are disposed in proximity to the optical element.

One technique of incorporating an electrical connector portion and an optical connector portion in a single connector is disclosed in Japanese Utility Model Registration No. 3067249.

In this connector, an optical element is contained in an electrically-conductive holder, and this holder intercepts electromagnetic noises which would otherwise act between electrical signal and power terminals and the optical element. In the above connector, a certain degree of an electromagnetic noise-reflecting and absorbing effect can be expected, but the electrically-conductive holder is not connected to the ground, and therefore when the electromagnetic noises resonate, the re-radiation of the noises is liable to occur, and besides, the electric potential is unstable, so that it is difficult to prevent the field coupling. Because of these factors, the sufficient noise-suppressing effect cannot be obtained.

In the case where a plurality of optical elements are incorporated in the connector, these optical elements need to be contained in electrically-conductive holders, respectively, so that the construction becomes complicated.

SUMMARY OF THE INVENTION

It is therefore an object of this invention to provide a connector device and a connector, in which one connector can be fittingly connected and withdrawn relative to the other connector in a proper posture.

Another object of this invention is to provide a connector capable of achieving a sufficient noise-suppressing effect. Another object of the invention is to provide a connector which can achieves the above primary object, and is simple in construction.

The above problem has been solved by a connector device of an aspect of the invention, which comprises a first connector including a first connector housing incorporating a first optical coupling connector portion, having at least one ferrule for holding an end portion of an optical fiber, and a plurality of first electrical connection terminal portions; and a second connector including a second connector housing incorporating a second optical coupling connector portion, having at least one ferrule receiving portion corresponding to the ferrule so as to receive the ferrule in connected relation thereto, and second electrical connection terminal portions corresponding respectively to the first electrical connection terminal portions so as to be connected respectively to the first electrical connection terminal portions; wherein in the first connector, the first electrical connection terminal portions are provided in a distributed manner around the first optical coupling connector portion; and wherein in the second connector, the second electrical connection terminal portions are provided in a distributed manner around the second optical coupling connector portion in corresponding relation to the first electrical connection terminal portions.

According to another aspect of the invention, preferably, one of the first and second connection terminal portions is a male connection terminal while the other is a female connection terminal.

According to another aspect of the invention, the first connector housing has a shape flattened in a direction of a width thereof, and the first optical coupling connector portion is provided at a widthwise central portion of the first connector housing, and the first electrical connection terminal portions are provided in a distributed manner at widthwise opposite side portions of the first connector housing; and the second connector housing has a shape flattened in a direction of a width thereof in corresponding relation to the first connector housing, and the second optical coupling connector portion is provided at a widthwise central portion of the second connector housing in corresponding relation to the first optical coupling connector portion, and the second electrical connection terminal portions are provided in a distributed manner at widthwise opposite side portions of the second connector housing in corresponding relation to the first electrical connection terminal portions.

According to another aspect of the invention, the ferrule, the ferrule receiving portion, the first connection terminal portions and the second connection terminal portions are arranged such that in the connection of the first and second connectors, a position where the ferrule begins to be inserted into the ferrule receiving portion is spaced in a direction of connection of the first and second connectors from a position where each of the first connection terminal portions begins to be inserted into the corresponding second connection terminal portion.

According to another aspect of the invention, the ferrule, the ferrule receiving portion, the first connection terminal portions and the second connection terminal portions are arranged such that in the connection of the first and second connectors, the ferrule begins to be inserted into the ferrule receiving portion after each of the first connection terminal portions begins to be inserted into the corresponding second connection terminal portion.

According to another aspect of the invention, an elongate guide projection is formed on one of the first and second connector housings, and extends in the direction of connection of the two connector housings, and a guide groove for guiding the elongate guide projection in the connecting direction is formed in the other.

According to another aspect of the invention, there is provided a connector comprising a connector housing incorporating an optical coupling connector portion, having at least one ferrule for holding an end portion of an optical fiber, and a plurality of electrical connection terminal portions; and the electrical connection terminal portions are provided in a distributed manner around the optical coupling connector portion.

According to another aspect of the invention, there is provided a connector comprising a connector housing incorporating an optical coupling connector portion, having at least one ferrule receiving portion for receiving a ferrule of a mating connector, and a plurality of electrical connection terminal portions; and the electrical connection terminal portions are provided in a distributed manner around the optical coupling connector portion.

According to another aspect of the invention, a connector for being mounted on and fixed to a mounting board, comprising a single connector housing in which an optical connector portion, including an optical element, and an electrical connector portion, including an electrical connection terminal portion, are incorporated; and an electrically-conductive plate-like member provided between the optical connector portion and the electrical connector portion, wherein a grounding terminal portion is formed on the electrically-conductive plate-like member, and extends outwardly from the connector housing so as to be connected to a grounding wiring pattern formed on the mounting board.

According to another aspect of the invention, preferably, the optical connector portion includes a plurality of optical elements.

According to another aspect of the invention, preferably, the electrical connector portion includes a plurality of electrical connection terminal portions; and each of the electrical connection terminal portions has a lead terminal portion which extends outwardly from the connector housing so as to be connected to the mounting board, and the lead terminal portions of the electrical connection terminal portions and the grounding terminal portion are arranged at generally equal intervals.

According to another aspect of the invention, preferably, a cross-sectional area of the grounding terminal portion is larger than a cross-sectional area of the lead terminal portion of each electrical connection terminal portion which extends outwardly from the connector housing so as to be connected to the mounting board.

DETAILED DESCRIPTION OF THE PREFERRED EMBODIMENTS

The First Preferred Embodiment

A preferred embodiment of a connector device of the present invention will now be described.

As shown in FIGS. 1 to 4, this connector device comprises a first connector 1 and a second connector 30 which can be connected together.

Figure 1:
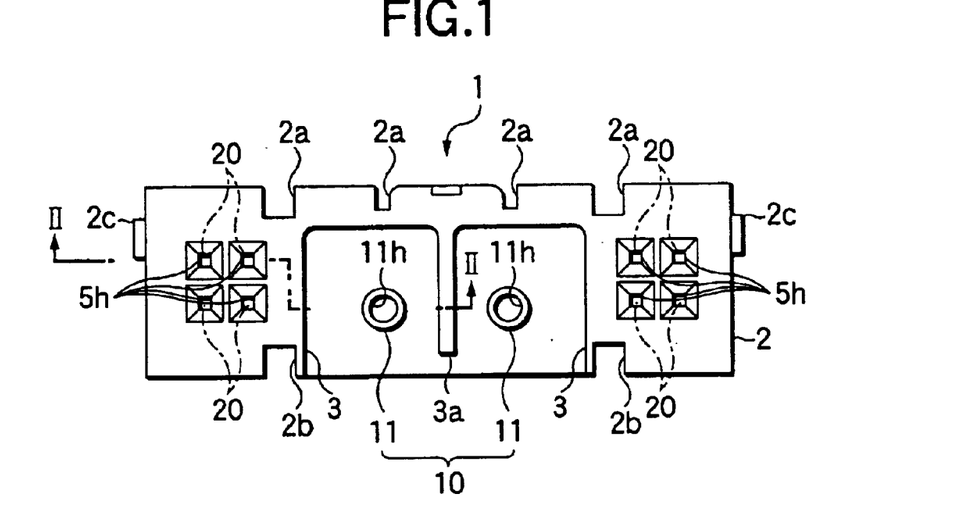
FIG. 1 is a front-elevational view showing a first connector of a connector device embodying the present invention.
Figure 2:
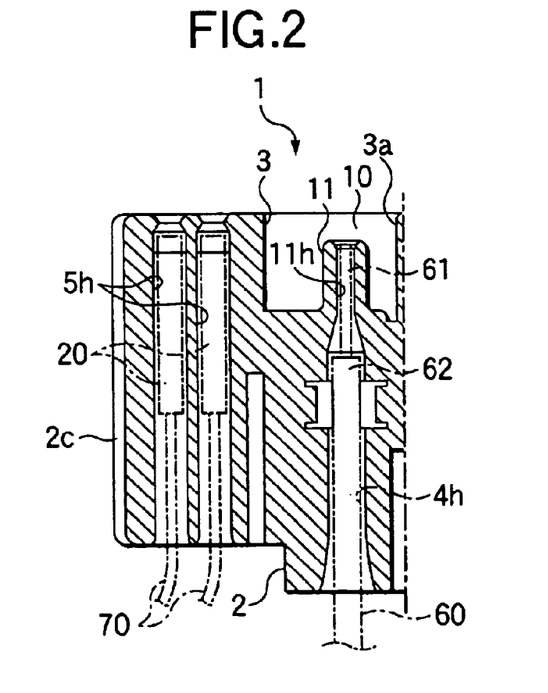
FIG. 2 is a cross-sectional view taken along the line II—II of FIG. 1.

As shown in FIGS. 1 and 2, the first connector 1 includes a first connector housing 2 incorporating an optical coupling connector portion 10 and a plurality of female connection terminal portions (serving as electrical connection terminal portions) 20.

The first connector housing 2 is made of a resin or the like, and is formed into a shape flattened in a direction of the width thereof, and more specifically this housing has a rectangular parallelepiped shape flattened in the widthwise direction.

The female connection terminal portions 20 are provided in a distributed manner around the optical coupling connector portion 10.

In this embodiment, the optical coupling connector portion 10 is provided at a widthwise central portion of the first connector housing 2. The first connector housing 2 may be formed into a box-like body having a generally square shape as viewed from the front side thereof, in which case the optical coupling connector portion 10 is provided at a central portion of this box-like body, and the female connection terminal portions 20 are provided at substantially equal intervals around this optical coupling connector portion 10.

The optical coupling connector portion 10 includes at least one (two in this embodiment) ferrule portion 11 holding an end portion of an optical fiber 61.

More specifically, a pair of right and left recesses 3, separated from each other by a partition wall 3a, are formed in a widthwise central portion of a front side of the first connector housing 2. The ferrule portions 11 of a generally tubular shape are formed in a projected manner within the recesses 3, respectively. A fiber receiving hole 11h for receiving the optical fiber 61 is formed in each ferrule portion 11, and cord receiving holes 4h each for receiving a sheath 62 of a corresponding optical fiber cord 60 are formed in the first connector housing 2, and are disposed respectively on lines of rearward extension of the fiber receiving holes 11h, respectively. When the pair of optical fiber cords 60, each having the optical fiber 61 exposed at an end portion thereof, are inserted into the respective cord receiving holes 4h and fiber receiving holes 11h from the rear side of the first connector housing 2, those portions of the optical fibers 61, exposed respectively at the end portions of these optical fiber cords, are received in the fiber receiving holes 11h, respectively, and at the same time those portions of the sheaths 62, disposed adjacent respectively to the exposed optical fibers, are received in the cord receiving hole portions 4h, respectively. Each optical fiber cord 60 is positioned and held in this condition in the cord receiving hole 4h and fiber receiving hole 11h, by a predetermined stopper, an adhesive or the like. An end surface of the optical fiber 61 is exposed at a distal end of the ferrule portion 11, and is processed into a specular surface.

In this embodiment, although the optical coupling connector portion 10 includes the two ferrule portions 11, it may include one ferrule portion 11 or three or more ferrule portions 11. Although the ferrule portions 11 are formed integrally with the first connector housing 2, the ferrule portions 11 may be separate from the first connector housing 2.

The female connection terminal portions 20 are provided in a distributed manner at the opposite side portions of the first connector housing 2 spaced from each other in the direction of the width thereof.

In this embodiment, a total of four female connection terminal portions 20 are provided in two (upper and lower) rows at each of the opposite side portions of the first connector housing 2, each row of female connection terminal portions 20 being juxtaposed to each other in the widthwise direction.

The female connection terminal portions 20 can receive male connection terminal portions 50 (described later), respectively, and are inserted respectively into terminal receiving holes 5h, formed in the first connector housing 2, from the rear side thereof, and are held in their respective predetermined positions in the terminal receiving holes 5h by positioning holding means (not shown) such as an engagement structure. Each female connection terminal portion 20 is fixedly secured to an end portion of a wire 70 by press-fastening means or the like, and the wire 70 is led to the exterior through a rear opening of the corresponding terminal receiving hole 5h.

Each of the terminal receiving holes 5h is open to the front side of the first connector housing 2, and when the male connection terminal portion 50 (described later) is inserted into the corresponding terminal receiving hole 5h through this front opening, the male connection terminal portion 50 is inserted into the corresponding female connection terminal portion 20 to be connected thereto.

Figure 3:
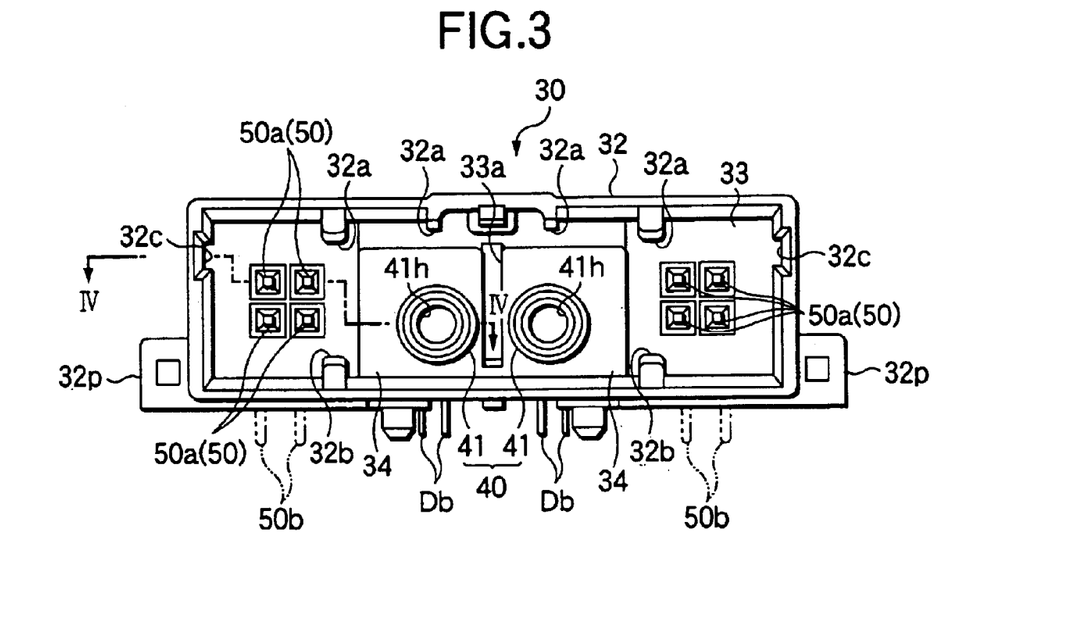
FIG. 3 is a front-elevational view showing a second connector of the connector device embodying the invention.
Figure 4:
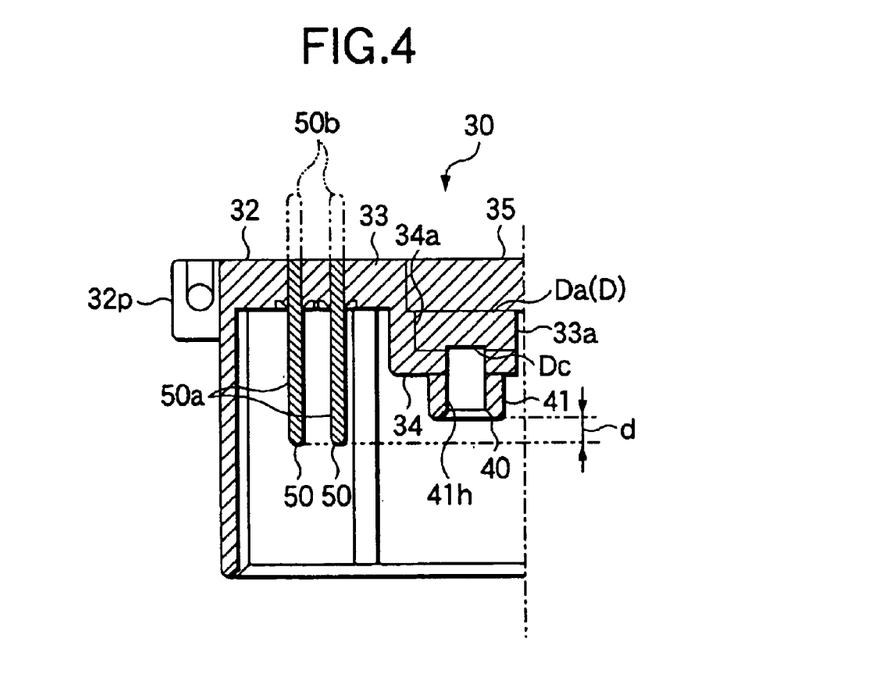
FIG. 4 is a cross-sectional view taken along the line IV—IV of FIG. 3.

As shown in FIGS. 3 and 4, the second connector 30 includes a second connector housing 32 incorporating an optical coupling connector portion 40 and the plurality of male connection terminal portions 50 serving as electrical connection terminal portions.

The second connector housing 32 is made of a resin or the like, and is formed into a shape flattened in a direction of the width thereof, and more specifically this housing is formed in to a box-like body flattened in the widthwise direction, and has a front opening, and the first connector housing 2 can be inserted into this second connector housing through this front opening to be connected thereto.

The male connection terminal portions 50 are provided in a distributed manner around the optical coupling connector portion 40.

The optical coupling connector portion 40 includes at least one (two in this embodiment) ferrule receiving portion 41 corresponding to the ferrule portion 11 so as to receive the ferrule portion 11 in connected relation thereto.

More specifically, a pair of right and left projections 34, separated from each other by a partition groove 33a, are formed in a widthwise central portion of an inner surface of a rear wall portion 33 of the second connector housing 32. A receiving recess 34a for receiving and holding an optical element (a light-emitting element or a light-receiving element) D is formed in each of the projections 34, and the ferrule receiving portion 41 is formed on a projected surface of the projection 34.

Each of the receiving recesses 34a has an open rear side, and the optical element D is inserted into the receiving recess 34a through this rear opening. A predetermined mounting member 35 is mounted in the rear openings of the receiving recesses 34a, and each optical element D is held in a predetermined position in the receiving recess 34a by this mounting member 35 pressed against this optical element D. Lead portions Db of each optical element D pass through a notch (not shown), formed in a bottom portion of the receiving recess 34a, and extend downwardly from the lower side of the second connector housing 32.

A ferrule guide hole 41h for receiving the ferrule portion 11 is formed in each of the ferrule receiving portions 41, and is disposed on a line of forward extension of an optical coupling portion (a light-receiving surface or a light-emitting surface) Dc of the optical element D received and held in the receiving recess 34a. When the first connector 1 and the second connector 30 are connected together, the ferrule portions 11 of the first connector 1 are inserted respectively into the ferrule guide holes 41h, formed respectively in the ferrule receiving portions 41, and the optical fiber 61, held in each ferrule portion 11, is guided toward the optical coupling portion Dc of the corresponding optical element D. When the ferrule portion 11 is inserted into the deepest position in the ferrule receiving portion 41, the end surface of the optical fiber 61 is disposed in opposed relation to the optical coupling portion Dc, so that the optical fiber 61 is optically coupled to the optical element D.

In this embodiment, although there are provided the two ferrule receiving portions 41 corresponding to the ferrule portions 11, one ferrule portion 41 or three or more ferrule portions 41 may be provided according to the number of the ferrule portions 11. In this embodiment, each optical element D is provided adjacent to the inner end of the corresponding ferrule receiving portion 41, and with this construction the optical fiber 61 of the first connector 2 can be optically coupled to the optical element D. However, there may be used a construction in which an optical fiber is disposed in each of the ferrule receiving portions 41 so as to be optically coupled to the corresponding optical fiber 61 of the first connector 2.

The male connection terminal portions 50 are provided in a distributed manner at the opposite side portions of the second connector housing 32 spaced from each other in the direction of the width thereof.

In this embodiment, a total of four male connection terminal portions 50 are provided in two (upper and lower) rows at each of the opposite side portions of the second connector housing 32 in corresponding relation to the female connection terminal portions 20, each row of male connection terminal portions 50 being juxtaposed to each other in the widthwise direction.

Each of the male connection terminal portions 50 includes a pin-like connection portion 50a for inserting connection to the corresponding female connection terminal portion 20, and a lead portion 50b for being soldered to a mounting board (not shown). Each male connection terminal portion extends through the rear wall portion 33 in such a manner that the connection portion 50a projects forwardly from the rear wall portion 33 into the interior of the second connector housing 32 while the lead portion 50b projects rearwardly from the rear wall portion 33. When the first connector 1 and the second connector 30 are connected together, the connection portion 50a of each male connection terminal portion 50 is inserted into the corresponding terminal receiving hole 5h in the first connector housing 2, and is inserted into the corresponding female connection terminal portion 20, received in this terminal receiving hole, and is connected thereto.

This second connector 30 is of the type adapted to be mounted on and fixed to the mounting board (not shown), and screw-fastening fixing piece portions 32p are formed in a projected manner on the opposite sides of the second connector housing 32, respectively. This second connector 30 is placed on the mounting board, and in this condition the screw-fastening fixing piece portions 32p are screw-fastened to the mounting board, and also the lead portions 50b of the male connection terminal portions 50, projecting from the rear surface of the second connector housing 32, and the lead portions Db of the optical elements D, projecting from the bottom surface of the second connector housing 32, are suitably soldered to wiring circuits formed on the mounting board.

In this embodiment, the female connection terminal portions 20, serving as the electrical connection terminal portions, are provided at the first connector 1, having the ferrule portions 11, while the male connection terminal portions 50, serving as the electrical connection terminal portions, are provided at the second connector 30 having the ferrule receiving portions 41. However, there may be used an arrangement in which the male connection terminal portions 50 are provided at the first connector 1 while the female connection terminal portions 20 are provided at the second connector 30.

In this connector device, the ferrule portions 11, the ferrule receiving portions 41, the male connection terminal portions 50 and the female connection terminal portions 20 are arranged such that in the connection of the first and second connectors 1 and 30, a position where each ferrule portion 11 begins to be inserted into the ferrule receiving portion 41 is spaced in the connecting direction from a position where each male connection terminal portion 50 begins to be inserted into the female connection terminal portion 20. This arrangement is such that each ferrule portion 11 is inserted into the ferrule receiving portion 40 after each male connection terminal portion 50 is inserted into the female connection terminal portion 20.

In this embodiment, the ends of the ferrule portions 11 and the ends of the female connection terminal portions 20 in the first connector 1 are disposed generally at the same position in the direction of connection of the first and second connectors 1 and 30 (see FIGS. 1 and 2), and in the second connector 30, the ends of the male connection terminal portions 50 forwardly project a distance d beyond the ends of the ferrule receiving portions 41 in the connecting direction (see FIGS. 3 and 4). When the first connector 1 and the second connector 30 are connected together, the male connection terminal portions 50 are first inserted into the female connection terminal portions 20, respectively, and thereafter the ferrule portions 11 are inserted into the ferrule receiving portions 41, respectively.

Four guide grooves 2a are formed in the upper surface of the first connector housing 2, and extend in the forward-rearward direction, and two guide grooves 2b are formed in the lower surface thereof, and extend in the forward-rearward direction, and one elongate guide projection 2c is formed on each of the opposite side surfaces thereof, and extend in the forward-rearward direction. On the other hand, four elongate guide projections 32a, corresponding respectively to the guide grooves 2a, are formed on an upper inner surface of the second connector housing 32, and two elongate guide projections 32b, corresponding respectively to the guide grooves 2b, are formed on a lower inner surface thereof, and a guide groove 32c, corresponding to the elongate guide projection 2c, is formed in each of opposite inner side surfaces thereof. When the first connector 1 and the second connector 30 are connected together, the elongate guide projections 32a and 32b are inserted respectively into the guide grooves 2a and 2b, and are guided by these grooves, respectively, and also the elongate guide projections 2c are inserted respectively into the guide grooves 32c, and are guided by these grooves, respectively. Therefore, the first and second connectors 1 and 30 are guided so that the two connectors 1 and 30 can be fittingly connected together in their proper postures.

In the connector device of the above construction, the first and second connectors 1 and 30 are connected together in the following manner.

First, when the first connector housing 2 is inserted into the second connector housing 32, the elongate guide projections 32a and 32b are inserted respectively into the guide grooves 2a and 2b, and are guided by these grooves, respectively, and also the elongate guide projections 2c are inserted respectively into the guide grooves 32c, and are guided by these grooves, respectively, so that the first and second connectors 1 and 30 are guided in their proper postures (in which the ferrules 11 are aligned respectively with the ferrule receiving portions 41 in the direction of connection of these connectors, and the male connection terminal portions 50 are aligned respectively with the female connection terminal portions 20 in the connecting direction). Then, when the first connector housing 2 is inserted in a predetermined amount into the second connector housing 32, the connection portions 50a of the male connection terminal portions 50 are inserted respectively into the terminal receiving holes 5h in the first connector housing 2, and begin to be inserted respectively into the female connection terminal portions 20 received respectively in these terminal receiving holes. In this condition, when the first connector housing is further inserted, so that the male connection terminal portions 50 are inserted in a predetermined amount into the female connection terminal portions 20, respectively, the ferrule portions 11 begin to be inserted into the ferrule receiving portions 41, respectively. When the first connector is further inserted into the final connected condition, the end surfaces of the optical fibers 61 are disposed in opposed relation to the optical coupling portions Dc, respectively, so that the optical fibers 61 are optically coupled to the optical elements D, respectively. Also, each of the male connection terminal portions 50 is inserted in the corresponding female connection terminal portion 20 to be connected thereto, so that the two are electrically connected together.

In the connector device of the above construction, the female connection terminal portions 20 are provided in a distributed manner around the optical coupling connector portion 10 of the first connector 1, and in the second connector 30, the male connection terminal portions 50 are provided in a distributed manner around the optical coupling connector portion 40. Therefore, the force, required for fittingly connecting and withdrawing the first and second connectors 1 and 30 relative to each other, is generally uniform over the peripheral portions of the two connectors 1 and 30. Referring more specifically to this embodiment, the first connector housing 2 has the shape flattened in the widthwise direction, and the optical coupling connector portion 10 is provided at the widthwise central portion of the first connector housing 2, and the female connection terminal portions 20 are provided in a distributed manner at the opposite side portions of the first connector housing 2 spaced from each other in the direction of the width thereof. The second connector housing 32 has the shape flattened in the widthwise direction, and the optical coupling connector portion 40 is provided at the widthwise central portion of the second connector housing 32, and the male connection terminal portions 50 are provided in a distributed manner at the opposite side portions of the second connector housing 32 spaced from each other in the direction of the width thereof. The force, required for fittingly connecting and withdrawing the first and second connectors 1 and 30 relative to each other, is generally uniform at the opposite side portions of the two connectors 1 and 30. Therefore, the first and second connectors 1 and 30 can be fittingly connected together and withdrawn from each other in their proper postures.

Therefore, when connecting the first and second connectors 1 and 30 together, an undue load is prevented from acting on the ferrule portions 11, the ferrule receiving portions 41, the male connection terminal portions 50 and the female connection terminal portions 20, and therefore these portions can be prevented from deformation and damage.

In the first connector 1, preferably, the female connection terminal portions 20 are arranged symmetrically with respect to the optical coupling connector portion 10 while in the second connector 30, the male connection terminal portions 50 are arranged symmetrically with respect to the optical coupling connector portion 40. However, in the cases where all the male connection terminal portions 50, as well as all the female connection terminal portions 20, are not the same in size and shape and where their number is odd, such a symmetrical arrangement can not be obtained. In such a case, for example, the distance of the female connection terminal portions 20 from the optical coupling connector portion 10, as well as the distance of the male connection terminal portions 50 from the optical coupling connector portion 40, are so adjusted that the force, required for fittingly connecting and withdrawing the first and second connectors 1 and 30 relative to each other, can be made generally uniform around the optical coupling connector portions 10 and 40.

In the connection of the first and second connectors 1 and 30, the position where each ferrule portion 11 begins to be inserted into the ferrule receiving portion 41 is spaced in the direction of connection of the two connectors 1 and 30 from the position where each male connection terminal portion 50 begins to be inserted into the female connection terminal portion 20. This arrangement is such that each ferrule portion 11 is inserted into the ferrule receiving portion 40 after each male connection terminal portion 50 is inserted into the female connection terminal portion 20. Therefore, the maximum inserting force, required for connecting the first and second connectors 1 and 30 together, can be reduced.

Namely, in the inserting connection of the ferrule portion 11 to the ferrule receiving portion 41, usually, the inserting force, required for this inserting connection, is the largest when the ferrule portion 11 begins to be inserted in to the ferrule receiving portion 41. In the connection of the male connection terminal portion 50 to the female connection terminal portion 20, the inserting force, required forth is inserting connection, is the largest when the male connection terminal portion 50 begins to be inserted in to the female connection terminal portion 20. Therefore, the position where each ferrule portion 11 begins to be inserted into the ferrule receiving portion 41, that is, where the force, required for this inserting connection, is the maximum, is spaced from the position where each male connection terminal portion 50 begins to be inserted into the female connection terminal portion 20, that is, where the force, required for this inserting connection, is the maximum, and with this construction, the maximum inserting force, required for connecting the first and second connectors land 30 together, can be reduced.

Each ferrule portion 11 is inserted into the corresponding ferrule receiving portion 41 after each male connection terminal portion 50 is inserted into the female connection terminal portion 20, and therefore an undue load is prevented from acting on the ferrule portion 11 and the ferrule receiving portion 41, thereby preventing these portions from deformation and damage.

Generally, the pressure of contact between each female connection terminal portion 20 and the corresponding male connection terminal portion 50 is set to a relatively high value so as to obtain the positive electrical connection between the two, and in many cases, the number of the female connection terminal portions 20 and the number of the male connection terminal portions 50 are relatively large. Because of these factors, generally, the force, required for connecting all of the female connection terminal portions 20 respectively to all of the male connection terminal portions 50, is larger than the force required for connecting the optical coupling connector portion 10 to the optical coupling connector portion 40. For connecting the first and second connectors 1 and 30 together, the large inserting force is particularly required when the male connection terminal portions 50 begin to be inserted into the female connection terminal portions 20, respectively, and because of an impact produced at the time of this connecting operation, the first and second connectors 1 and 30 are liable to be disturbed in posture. Therefore, when trying to connect the male connection terminal portions 50 to the respective female connection terminal portions 20 after inserting the optical coupling connector portion 10 into the optical coupling connector portion 40, an impact, produced at the time of connection of the male connection terminal portions 50 to the female connection terminal portions 20, is applied to those portions of each ferrule portion 11 and the corresponding ferrule receiving portion 41 connected together, and this leads to a fear that the ferrule portions 11 and the ferrule receiving portions 41 are deformed and damaged. Therefore, each ferrule portion 11 is inserted into the ferrule receiving potion 41 after each male connection terminal portion 50 is inserted into the female connection terminal portion 20, and by doing so, an impact, produced at the time of connection of the male connection terminal portions 50 to the female connection terminal portions 20, is prevented from being applied to those portions of each ferrule portion 11 and the ferrule receiving portion 41 connected together, thereby preventing the ferrule portions 11 and the ferrule receiving portions 41 from being deformed and damaged. And besides, when each ferrule portion 11 begins to be inserted into the ferrule receiving portion 41, the ferrule portions 11 and the ferrule receiving portions 41 are guided by the inserting connection of the male connection terminal portions 50 to the female connection terminal portions 20, and therefore in this respect, also, an undue force is prevented from acting on the ferrule portions 11 and the ferrule receiving portions 41, thereby preventing the deformation and damage of the ferrule portions 11 and the ferrule receiving portions 41.

In addition, the guide grooves 2a and 2b and the elongate guide projections 2c are provided at the first connector housing 2 while the elongate guide projections 32a and 32b and the guide grooves 32c are provided at the second connector housing 32. Therefore, when connecting the first and second connectors 1 and 30 together, the elongate guide projections 32a and 32b are inserted respectively into the guide grooves 2a and 2b, and are guided by these grooves, respectively, and also the elongate guide projections 2c are inserted respectively into the guide grooves 32c, and are guided by these grooves, respectively. Therefore, the first and second connectors 1 and 30 are guided so that the two connectors 1 and 30 can be fittingly connected together more surely in their proper postures.

In the connector device of the above construction, the first electrical connection terminal portions are provided in a distributed manner around the first optical coupling connector portion in the first connector, and in the second connector, the second electrical connection terminal portions are provided in a distributed manner around the second optical coupling connector portion in corresponding relation to the first electrical connection terminal portions. Therefore, the force, required for fittingly connecting and withdrawing the first and second connectors relative to each other, is generally uniform over the peripheral portions of the first and second connectors. Therefore, the first and second connectors can be fittingly connected together and withdrawn from each other in their proper postures.

In the connector device of the above, the first connector housing has the shape flattened in the direction of the width thereof, and the first optical coupling connector portion is provided at the widthwise central portion of the first connector housing, and the first electrical connection terminal portions are provided in a distributed manner at the widthwise opposite side portions of the first connector housing, and the second connector housing has the shape flattened in the direction of the width thereof in corresponding relation to the first connector housing, and the second optical coupling connector portion is provided at the widthwise central portion of the second connector housing in corresponding relation to the first optical coupling connector portion, and the second electrical connection terminal portions are provided in a distributed manner at the widthwise opposite side portions of the second connector housing in corresponding relation to the first electrical connection terminal portions. Therefore, the force, required for fittingly connecting and withdrawing the first and second connectors relative to each other, is generally uniform at the opposite side portions of the two connectors. Therefore, the first and second connectors can be fittingly connected together and withdrawn from each other in their proper postures.

In the connector device of the above, in the connection of the first and second connectors, the position where the ferrule begins to be inserted into the ferrule receiving portion is spaced in the direction of connection of the first and second connectors from the position where each of the first electrical connection terminal portions begins to be inserted into the corresponding second electrical connection terminal portion. Thus, the position where the ferrule portion begins to be inserted into the ferrule receiving portion, that is, where the force, required for this inserting connection, is the maximum, is spaced from the position where each first electrical connection terminal portion begins to be inserted in to the second electrical connection terminal portion, that is, where the force, required for this inserting connection, is the maximum, and with this construction, the maximum inserting force, required for connecting the first and second connectors together, can be reduced.

In the connector device of the above, in the connection of the first and second connectors, the ferrule begins to be inserted into the ferrule receiving portion after each of the first electrical connection terminal portions begins to be inserted into the corresponding second electrical connection terminal portion. Therefore, an impact, produced at the time of connection of the first electrical connection terminal portions to the second electrical connection terminal portions, will not act on the ferrule and the ferrule receiving portion, and therefore in this respect, also, an undue force is prevented from acting on the ferrule portion and the ferrule receiving portion, thereby preventing the deformation and damage of these portions.

In the connector device of the above, the elongate guide projections are formed on one of the first and second connector housings, and extend in the direction of connection of said two connector housings, and the guide grooves for respectively guiding the elongate guide projections in the connecting direction are formed in the other. With this construction, the first and second connectors can be more surely fittingly connected together and withdrawn from each other in their proper postures.

In the connector of the above, the electrical connection terminal portions are provided in a distributed manner around the optical coupling connector portion. Therefore, the force, required for fittingly connecting and withdrawing this connector and the mating connector relative to each other, is generally uniform over the peripheral portion of this connector. Therefore, this connector and the mating connector can be fittingly connected together and withdrawn from each other in their proper postures.

In the connector of the above, the electrical connection terminal portions are provided in a distributed manner around the optical coupling connector portion. Therefore, the force, required for fittingly connecting and withdrawing this connector and the mating connector relative to each other, is generally uniform over the peripheral portion of this connector. Therefore, this connector and the mating connector can be fittingly connected together and withdrawn from each other in their proper postures.

The Second Preferred Embodiment

Another preferred embodiment of a connector of the present invention will now be described with reference to FIGS. 5 to 8.

This connector 101 is adapted to be mounted on and fixed to a predetermined mounting board 140 (see FIG. 8), and an optical connector portion 110 and an electrical connector portion 120 are incorporated in a single connector housing 102. An electrically-conductive plate-like member 130 is provided between the optical connector portion 110 and the electrical connector portion 120, and a grounding terminal portion 132 is formed on the electrically-conductive plate-like member 130, and extends outwardly from the connector housing 102.

Figure 5:
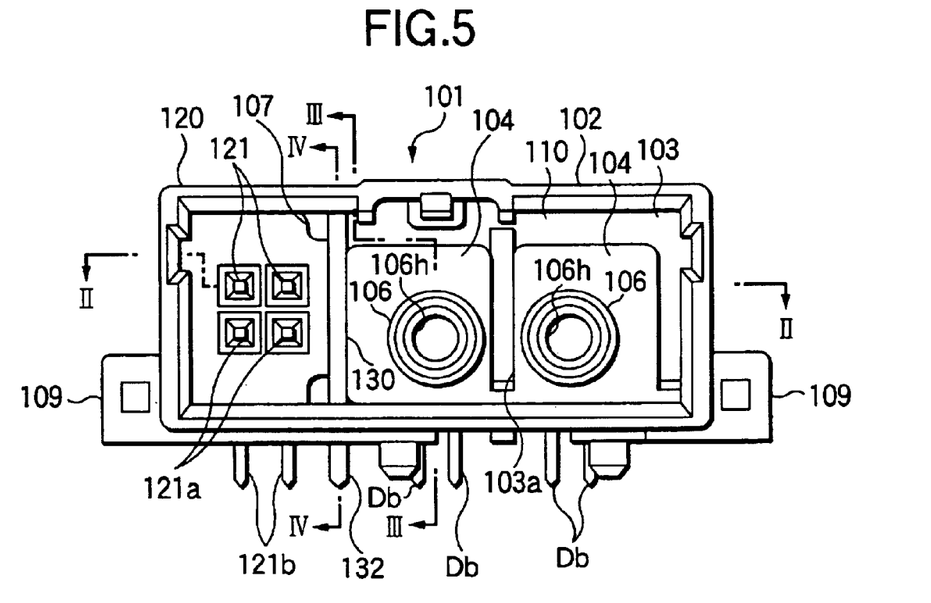
FIG. 5 is a front-elevational view showing a preferred embodiment of a connector of the present invention.
Figure 6:
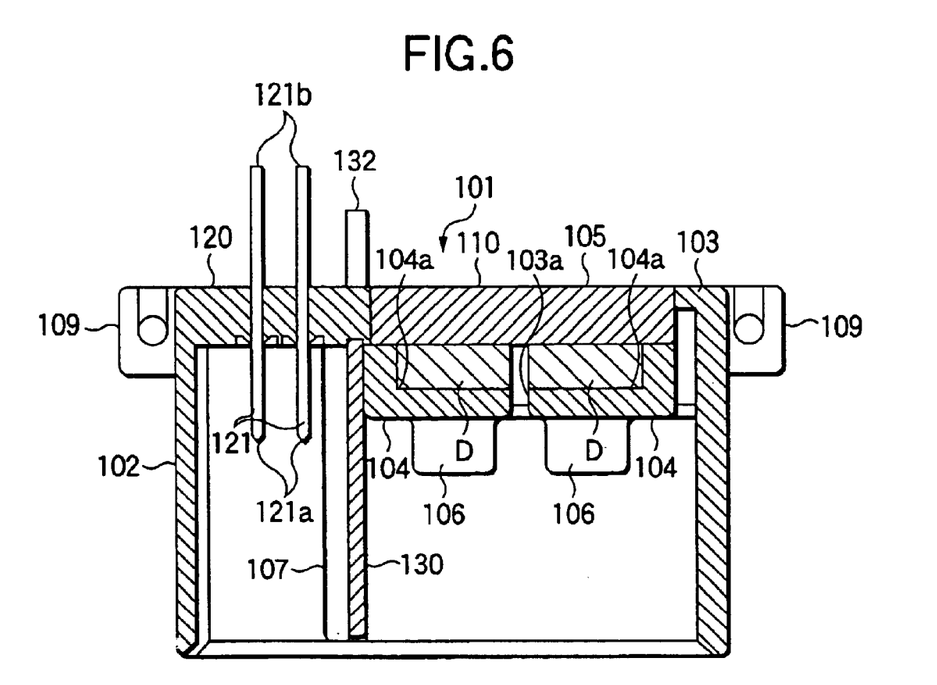
FIG. 6 is a cross-sectional view taken along the line II—II of FIG. 5.
Figure 7:
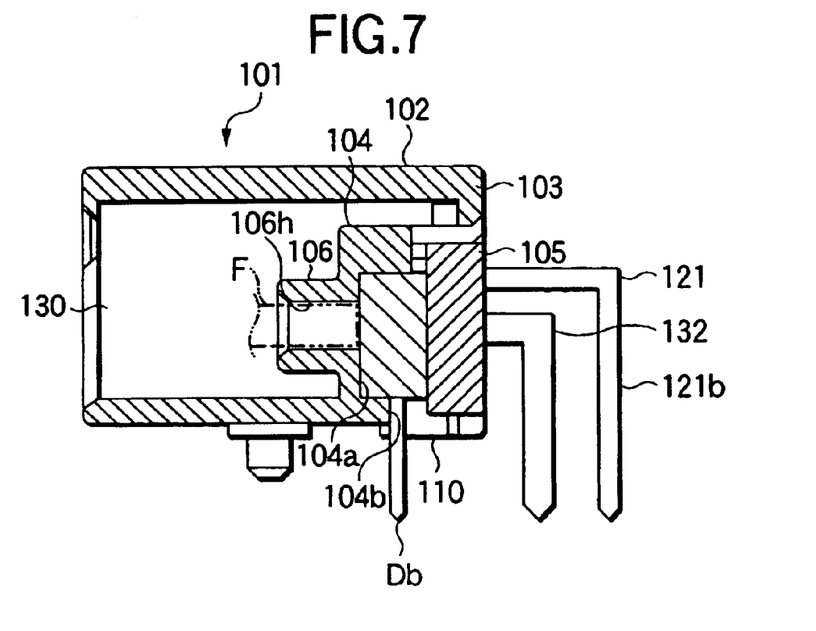
FIG. 7 is a cross-sectional view taken along the line III—III of FIG. 5.

The constituent elements will be described specifically. The connector housing 102 is made of a resin or the like, and has a shape flattened in a direction of the width thereof. More specifically, this connector housing is formed into a generally box-shape, flattened in the widthwise direction, and has an open front side. A mating connector housing can be connected to this connector housing 102 through the front opening thereof.

The optical connector portion 110, including optical elements D, is incorporated in one side portion (right side portion in FIGS. 5 and 6) of the connector housing 102.

A pair of right and left projections 104, separated from each other by a partition groove 103a, are formed on an inner surface of a rear wall portion 103 of the connector housing 102, and are juxtaposed to each other in the widthwise direction. A receiving recess 104a for receiving the optical element (a light-emitting element or a light-receiving element) D is formed in each of the projections 104, and a ferrule receiving portion 106 is formed on a projected front surface of the projection 104.

Each of the receiving recesses 104a is open to the rear side of the connector housing 102, and each optical element D is inserted into the corresponding receiving recess 104a through this rear opening. The optical elements D are thus received in the receiving recesses 104a, respectively, and in this condition a predetermined mounting member 105 is fixedly mounted in the rear openings of the receiving recesses 104a by an adhesive or the like, and each optical element D is held in the receiving recess 104a by this mounting member 105 pressed against this optical element D. Lead portions Db of each optical element D pass through a notch 104b; formed in a bottom portion of the receiving recess 104a, and extend downwardly from the lower side of the connector housing 102. This connector 101 is mounted on and fixed to the mounting board 140, and in this condition the lead portions Db can be soldered to wiring patterns formed on the mounting board 140.

A ferrule guide hole 106h for receiving a ferrule portion F (see FIG. 7) of the mating connector is formed in each of the ferrule receiving portions 106, and is disposed on a line of forward extension of an optical coupling portion of the optical element D received and held in the receiving recess 104a. When this connector 101 and the mating connector are connected together, the ferrule portions F of the mating connector are inserted respectively into the ferrule guide holes 106h, and an end surface of an optical fiber, held in each ferrule portion F, is disposed in opposed relation to the corresponding optical coupling portion, so that the optical fiber is optically coupled to the optical element D.

In this manner, the optical connector portion 110, having the optical elements D, is incorporated in the connector housing 102.

In this embodiment, although there are provided the two optical elements D, one optical element D or three or more optical elements D may be provided.

The electrical connector portion 120, having electrical connection terminal portions 121, is incorporated in the other side portion (left side portion in FIGS. 5 and 6).

Namely, the electrical connection terminal portions 121 are provided at the other side portion of the rear wall portion 103 of the connector housing 102. In this embodiment, a total of four electrical connection terminal portions 121 are provided in two (upper and lower) rows at the other side portion of the rear wall portion 103, each row of electrical connection terminal portions 121 being juxtaposed to each other in the widthwise direction.

Each of the electrical connection terminal portions 121 includes a pin-like connection portion 121a for inserting connection to a female connection terminal portion (not shown) of the mating connector, and a lead terminal portion 121b for being soldered to the mounting board 140, and the lead terminal portion 121b extends substantially perpendicularly from the connection portion 121a. Each electrical connection terminal portion extends through the rear wall portion 103 in such a manner that the connection portion 121a projects forwardly from the rear wall portion 103 into the interior of the connector housing 102 while the lead terminal portion 121b projects rearwardly from the rear wall portion 103, and further is bent to extend downwardly.

When this connector 101 and the mating connector are connected together, the connection portions 121a of the electrical connection terminal portions 121 are inserted respectively into the female connection terminal portions (not shown) of the mating connector, and are connected thereto. This connector 101 is mounted on and fixed to the mounting board 140, and in this condition the lead terminal portions 121b can be soldered to wiring patterns formed on the mounting board 140.

In this manner, the electrical connector portion 120, having the electrical connection terminal portions 121, is incorporated in the connector housing 102.

In this embodiment, although the four electrical connection terminal portions 121 are provided, three or less electrical connection terminal portions 121 or five or more electrical connection terminal portions 121 may be provided. Although the electrical connection terminal portions 121, each having the male connection portion 121a, are provided at the connector 101 (while the female terminals are provided at the mating connector), the connection portion 121a of each electrical connection terminal portion 121, provided at the connector 101, may have a female terminal-shape.

The electrically-conductive plate-like member 130 is provided between the optical connector portion 110 and the electrical connector portion 120, and the grounding terminal portion 132, extending outwardly from the connector housing 102, is formed on this electrically-conductive plate-like member 130.

The electrically-conductive plate-like member 130 and the grounding terminal portion 132 are formed integrally with each other, and they are formed, using an electrically-conductive sheet (such as a metal sheet) or a sheet of an insulative material (such as a resin) coated with an electrically-conductive material.

The electrically-conductive plate-like member 130 has a generally square shape corresponding to a vertical cross-sectional shape of the interior of the connector housing 102, and this plate-like member 130 can be mounted on the connector housing 102 to divide the internal space thereof into two (right and left) sections.

With respect to the mounting form in this embodiment, elongate projections 107 are formed respectively on those portions of the upper and lower inner surfaces of the connector housing 102, disposed between the optical connector portion 110 and the electrical connector portion 120, and extend in a forward-rearward direction. The electrically-conductive plate-like member 130 is inserted into the connector housing 102 while one side or face of this electrically-conductive plate-like member 130 is contacted at its upper and lower edge portions with the elongate projections 107, and a rear end portion of the electrically-conductive plate-like member 130 is held between the pair of elongate projections 107 and the projection 104.

There may be used another construction in which the upper and lower edges of the electrically-conductive plate-like member 130 are merely adhesively bonded to the upper and lower inner surfaces of the connector housing 102, respectively.

Figure 8:
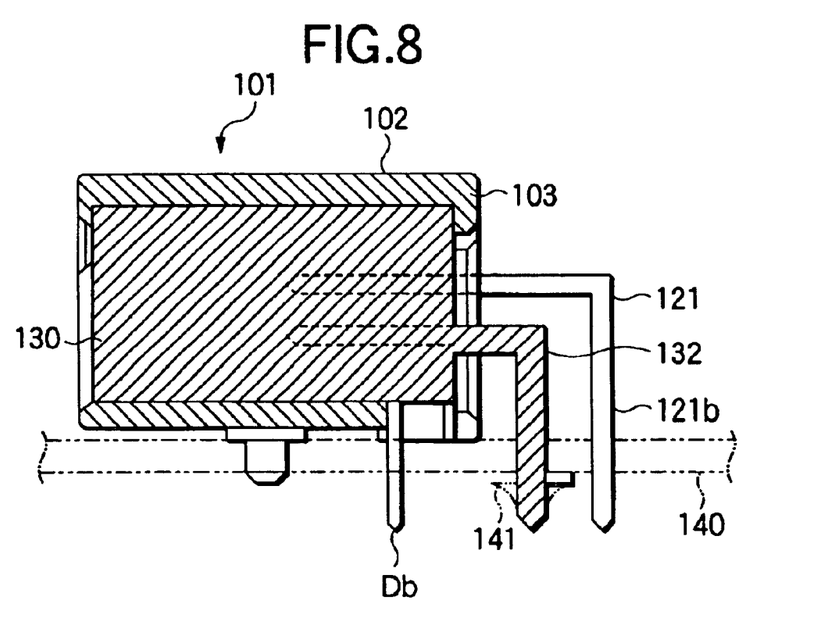
FIG. 8 is a cross-sectional view taken along the line IV—IV of FIG. 5.

The grounding terminal portion 132 is formed on and projects rearwardly from the rear edge of the electrically-conductive plate-like member 130. The grounding terminal portion 132 passes through the rear wall portion 103 of the connector housing 102, and extends rearwardly from this rear wall portion 103. That portion of the grounding terminal portion 132, extending outwardly from this rear wall portion, is bent at substantially right angles intermediate opposite ends of this outwardly-extending portion, and further extends downwardly beyond the lower side of the connector housing 102, and can be connected to a grounding wiring pattern 141, formed on the mounting board 140, by soldering or the like.

Screw-fastening fixing portions 109 for being screw-fastened to the mounting board 140 are formed on the opposite sides of the connector housing 102, respectively.

The connector 101 of the above construction is mounted on and fixed to the mounting board 140 in the following manner.

There is prepared the mounting board 140 having the grounding wiring pattern 141 and the predetermined wiring patterns formed on the lower surface thereof. The lower end portions of the lead portions Db of the optical elements D of the optical connector portion 110, the lower end portions of the lead terminal portions 121b of the electrical connection terminal portions 121 of the electrical connector portion 120, and the lower end portion of the grounding terminal portion 132 of the electrically-conductive plate-like member 130 are passed respectively through corresponding through holes, formed through the mounting board 140, to project from the lower surface of this mounting board 140. Then, at the lower side of the mounting board 140, the lead portions Db of the optical elements D and the lead terminal portions 121b of the electrical connection terminal portions 121 are soldered to the predetermined signal wiring patterns, and also the grounding terminal portion 132 is soldered to the grounding wiring pattern 141. Each of the screw-fastening fixing portions 109 of the connector housing 102 is fixedly secured to the mounting board 140 by a screw (not shown).

Thus, the operation for mounting and fixing the connector 101 relative to the mounting board 140 is finished.

In the connector 101 of the above construction, the electrically-conductive plate-like member 130 is provided between the optical connector portion 110 and the electrical connector portion 120, and the grounding terminal portion 132 is formed on this electrically-conductive plate-like member 130, and extends outwardly from the connector housing 102 so as to be connected to the grounding wiring pattern 141. Therefore, the electromagnetic shielding can be provided between the optical connector portion 110 and the electrical connector portion 120 by the electrically-conductive plate-like member 130 grounded via the grounding terminal portion 132, so that the sufficient noise-suppressing effect can be obtained.

Preferably, the cross-sectional area of the grounding terminal portion 132 is made larger than the cross-sectional area of the lead terminal portion 121a of the electrical connection terminal portion 121 in order that the grounding resistance of the electrically-conductive plate-like member 130 can be made as small as possible so as to obtain the sufficient noise-suppressing effect.

In the case where the optical connector portion 110 includes a plurality of optical elements D, it is not necessary that the optical elements should be contained respectively in electrically-conductive holders or the like as in the conventional construction, but it is only necessary to provide the electrically-conductive plate-like member between the optical connector portion 110 and the electrical connector portion 120. In this respect, the construction can be simplified.

In this embodiment, although the grounding terminal portion 132 is passed through the through hole, formed through the mounting board 140, and is soldered to the wiring pattern 141, the grounding terminal portion 132 may be connected to a grounding wiring pattern, using other construction. For example, the grounding terminal portion 132 may be formed into a tab-like shape (small plate piece-shape) so as to be held in surface-to-surface contact with a grounding wiring pattern, formed on the upper surface of the mounting board 140, when the optical connector 101 is mounted on and fixed to the mounting board 140, and thus this grounding terminal portion is brought into surface-to-surface contact with this wiring pattern for grounding purposes.

In this connector 101, it is only necessary to provide the electrically-conductive plate-like member 130 between the optical connector portion 110 and the electrical connector portion 120, and therefore this connector can be easily formed into such a construction that the electrically-conductive plate-like member 130 can be incorporated into the connector later when the noise problem is encountered with the optical connector 110 and the electrical connector portion 120.

Preferably, the lead terminal portions 121b of the electrical connection terminal portions 121 and the grounding terminal portion 132 are arranged at generally equal intervals in a predetermined direction (for example, in the direction of the width of the connector 101), and by doing so, there is achieved an advantage that the wiring patterns on the mounting board 140 can be easily designed.

Preferably, the dimensions of the four sides of the electrically-conductive plate-like member 130 are so determined as not to agree with an odd-numbered multiple of a quarter wavelength of the signal frequency, handled by the optical elements D or the electrical connection terminals 121, so that the electrically-conductive plate-like member 130 will not function as an antenna.

In the connector of the above construction, the electrically-conductive plate-like member is provided between the optical connector portion and the electrical connector portion, and the grounding terminal portion is formed on the electrically-conductive plate-like member, and extends outwardly from the connector housing so as to be connected to the grounding wiring pattern formed on the mounting board. Therefore, the electromagnetic shielding can be provided between the optical connector portion and the electrical connector portion by the electrically-conductive plate-like member grounded via the grounding terminal portion, so that the sufficient noise-suppressing effect can be obtained.

The electrically-conductive plate-like member is provided between the optical connector portion and the electrical connector portion, and therefore in the case where the optical connector portion includes a plurality of optical elements, it is not necessary that the optical elements should be contained respectively in electrically-conductive holders or the like as in the conventional construction, and in this respect, the construction can be simplified.

The lead terminal portions of the electrical connection terminal portions and the grounding terminal portion are arranged at generally equal intervals, and by doing so, the wiring patterns on the mounting board can be easily designed.

The cross-sectional area of the grounding terminal portion is larger than the cross-sectional area of the lead terminal portion of each electrical connection terminal portion, and by doing so, the grounding resistance of the electrically-conductive plate-like member can be made small, so that the sufficient noise-suppressing effect can be obtained.

What is claimed is:

1. A connector device comprising:
   a first connector including a first connector housing, the first connector housing incorporating a first optical coupling connector portion and a plurality of first electrical connection terminal portions, the first optical coupling connector portion being formed integrally with the first connector housing and having at least one ferrule for holding an end portion of an optical fiber; and
   a second connector including a second connector housing, the second connector housing incorporating a second optical coupling connector portion and second electrical connection terminal portions, the second optical coupling connector portion having at least one ferrule receiving portion, formed on a projected surface of a projection of the second connector housing, to receive the ferrule, the second electrical connection terminal portions corresponding respectively to the first electrical connection terminal portions to be connected to the first electrical connection terminal portions;
   wherein,
      in the first connector, the first electrical connection terminal portions are provided in a distributed manner around the first optical coupling connector portion;
      in the second connector, the second electrical connection terminal portions are provided in a distributed manner around the second optical coupling connector portion in corresponding relation to the first electrical connection terminal portions; and
      in the connection of the first and the second connector, the time when the ferrule begins to be inserted into the ferrule receiving portion is different from the time when the first connection terminal portions begin to be inserted into the corresponding second connection terminal portion.

2. The connector device according to claim 1, wherein one of the first and second connection terminal portions is a male connection terminal portion while the other is a female connection terminal.

3. The connector device according to claim 1,
   wherein
      the first connector housing has a shape flattened in a direction of a width thereof;
      the first optical coupling connector portion is provided at a widthwise central portion of the first connector housing;
      the first electrical connection terminal portions are provided in a distributed manner at widthwise opposite side portions of the first connector housing;
      the second connector housing has a shape flattened in a direction of a width thereof in corresponding relation to the first connector housing;
      the second optical coupling connector portion is provided at a widthwise central portion of the second connector housing in corresponding relation to the first optical coupling connector portion; and
      the second electrical connection terminal portions are provided in a distributed manner at widthwise opposite side portions of the second connector housing in corresponding relation to the first electrical connection terminal portions.

4. The connector device according to claim 1,
   wherein
      the first connector and the second connector are mutually connected in a prescribed direction; and,
      in the connection of the first and the second connector, a position where the ferrule begins to be inserted into the ferrule receiving portion is spaced in the prescribed direction from a position where the first connection terminal portions begins to be inserted into the corresponding second connection terminal portion.

5. The connector device according to claim 4,
   wherein,
      in the connection of the first and the second connector, the ferrule begins to be inserted into the ferrule receiving portion after each of the first connection terminal portions begins to be inserted into the corresponding second connection terminal portion.

6. The connector device according to claim 1,
   wherein
      an elongate guide projection is formed on one of the first and second connector housings to extend in a direction of connection of the two connector housings; and
      a guide groove which guides the elongate guide projection in the connecting direction is formed in the other.

7. A connector comprising:
   a connector housing incorporating an optical coupling connector portion and a plurality of electrical connection terminal portions, the optical coupling connector portion being formed integrally with the first connector housing, and having at least one ferrule, to be received by a ferrule receiving portion formed on a projected surface of a projection of a second connector housing, for holding an end portion of an optical fiber,
   wherein
      the electrical connection terminal portions are provided in a distributed manner around the optical coupling connector portion; and
      in the connection of the first and the second connector, the time when the ferrule begins to be inserted into the ferrule receiving portion is different from the time when the first connection terminal portions begin to be inserted into the corresponding second connection terminal portion.

8. A connector comprising:
   a connector housing incorporating an optical coupling connector portion and a plurality of electrical connection terminal portions, the optical coupling connector portion having a projection extending from the connector housing and at least one ferrule receiving portion, formed on a projected surface of the projection of the connector housing, for receiving a ferrule of a mating connector, wherein the electrical connection terminal portions are provided in a distributed manner around the optical coupling connector portion; and in the connection of the first and the second connector, the time when the ferrule begins to be inserted into the ferrule receiving portion is different from the time when the first connection terminal portions begin to be inserted into the corresponding second connection terminal portion.

9. A connector for being mounted on and fixed to a mounting board, comprising:

an optical connector portion including an optical element, an electrical connector portion including an electrical connection terminal portion, a connector housing which houses both the optical connector portion and the electrical connector portion, and an electrically-conductive plate-like member provided between the optical connector portion and the electrical connector portion, wherein the electrically-conductive plate-like member has a grounding terminal portion extending outwardly from the connector housing to be connected to a grounding wiring pattern formed on the mounting board; and the optical element is not at least partially covered by a conductive material.

10. The connector according to claim 9 wherein the optical connector portion includes a plurality of optical elements.

11. The connector according to claim 9, wherein the electrical connector portion includes a plurality of electrical connection terminal portions;

each of the electrical connection terminal portions has a lead terminal portion which extends outwardly from the connector housing to be connected to the mounting board; and the lead terminal portions of the electrical connection terminal portions and the grounding terminal portion are arranged at equal intervals.

12. The connector according to claim 9, wherein the electrical connection terminal portions has a lead terminal portion which extends outwardly from the connector housing to be connected to the mounting board; and a cross-sectional area of the grounding terminal portion is larger than a cross-sectional area of the lead terminal portion.

* * * * *